Patented Dec. 18, 1934

1,984,835

UNITED STATES PATENT OFFICE 1,984,835

METHOD OF MAKING TOOLS

Hans Kohl, Berlin-Siemensstadt, Germany, assignor to Siemens & Halske, Aktiengesellschaft, Siemensstadt, near Berlin, Germany, a corporation of Germany No Drawing. Application September 6, 1932, Serial No. 631,860. In Germany September 9, 1931

4 Claims. (Cl. 51—280)

My invention relates to a method of making tools, and is particularly concerned with making grinding, polishing stones or the like and oil stones consisting of aluminum oxide.

According to the invention a highly pure aluminum oxide, preferably calcined aluminum oxide is finely ground and treated with a dilute acid, particularly hydrochloric acid so as to form a mixture or slip which, according to its moisture content, may be either poured into absorbing molds or may be shaped by pressing, stamping or the like, to form the desired bodies. To this end, no binding agent of whatever kind is employed in order to render the slip plastic. The shaped and formed bodies after drying are then sintered at a temperature below 1,600° C. A sintering temperature of 1,400° C. has proved to be favorable.

The bodies made according to the above-described method are not completely compact but possess a certain porosity which amounts to about 6 to 15 per cent by volume.

The tools sintered at a relatively low temperature are particularly suitable for machining relatively soft metals, such as, for instance, copper, especially plates for the copper-plate printing. It has hitherto been common practice to use a natural stone which belongs to the class of oil slates for grinding and polishing such plates. This natural stone is difficult to procure, very expensive, and is not free from contaminations.

On the other hand, an oil stone consisting of pure aluminum oxide sintered according to the present method at a temperature of, say, 1,400° C. is considerably cheaper. It may be manufactured in any amounts, and is completely free from contamination. Besides, it has the property that the soft copper metal does not smear or clog the pores of the stone so that it remains always sharp. An oil stone of aluminum oxide sintered at a lower temperature is somewhat porous; it may, therefore, be easily cleaned by washing it with oil or water. Since no binding agent is employed for its manufacture which impairs the uniformity of the machined surface, and since the stone does not contain any occluded air or gas the surface may be utilized to the full extent; besides, the grinding with the aid of these stones may be rapidly accomplished with the result that a greater effect is obtained with a smaller grinding surface as compared to the natural stone.

Bodies produced in accordance with my novel method may also be used in the art of dentistry, in place of the grinding tools now known. The customary stones or tools of this character are sintered at high temperatures or are provided with vitreous binding agents. They get extremely hot in operation, with the result that the treatment may be painful to the patients and handicap the working of the operators. The stones and tools produced according to the invention do not show this drawback, i. e., they do not get hot, due to their porosity, and also due to the facility with which the crystals may be pulled apart.

I claim as my invention:

1. The method of making tool bodies of the class described, consisting in taking finely ground substantially pure aluminum oxide, treating said oxide with diluted hydrochloric acid to form a plastic mixture, shaping said tool bodies from said mixture, drying said bodies to remove said acid, and sintering said bodies at a temperature below 1600° C.

2. The method of making porous tool bodies of the class described, consisting in taking finely ground substantially pure aluminum oxide, treating said oxide solely with diluted hydrochloric acid to form a plastic mixture, shaping said tool bodies from said mixture, drying said bodies to remove said acid, and sintering said bodies at a temperature below 1600° C.

3. The method of making porous tool bodies of the class described, consisting in taking finely ground substantially pure aluminum oxide, treating said oxide solely with diluted hydrochloric acid to form a plastic mixture, shaping said tool bodies from said mixture, drying said bodies to remove said acid, and sintering said bodies at a temperature below 1600° C., the porosity of said bodies being about 6 to 15 percent by volume.

4. As an article of manufacture, a sintered refractory tool of the class described shaped prior to sintering from a plastic mixture consisting of substantially pure aluminum oxide brought to a plastic moldable state solely by the addition of diluted hydrochloric acid and then dried to remove said acid and subsequently sintered at a temperature below 1600° C.

HANS KOHL.